United States Patent
Viegener

(10) Patent No.: US 7,201,382 B2
(45) Date of Patent: Apr. 10, 2007

(54) SEALING ELEMENT

(75) Inventor: Walter Viegener, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 0 days.

(21) Appl. No.: 11/122,113

(22) Filed: May 5, 2005

(65) Prior Publication Data
US 2005/0248099 A1 Nov. 10, 2005

(30) Foreign Application Priority Data
Jun. 7, 2004 (DE) ................ 20 2004 007 290 U

(51) Int. Cl.
F16L 17/06 (2006.01)
H02G 15/04 (2006.01)

(52) U.S. Cl. ................ 277/611; 277/616; 285/374

(58) Field of Classification Search ........... 277/611, 277/616, 624, 626, 627; 285/110–113, 339, 285/374
See application file for complete search history.

(56) References Cited

U.S. PATENT DOCUMENTS

| | | | |
|---|---|---|---|
| 2,201,372 A | * | 5/1940 | Miller ................ 285/105 |
| 2,225,208 A | | 12/1940 | Crickmer |
| 3,057,630 A | | 10/1962 | Sneed |
| 3,323,806 A | | 6/1967 | Smith et al. |
| 3,601,419 A | | 8/1971 | Fern |
| 3,663,024 A | | 5/1972 | Traub |
| 3,874,709 A | * | 4/1975 | MacDonald ............. 285/104 |
| 3,889,958 A | | 6/1975 | Bennett |
| 4,018,462 A | | 4/1977 | Saka |
| 4,229,026 A | * | 10/1980 | Seiler ................ 285/105 |
| 4,449,718 A | | 5/1984 | Müller |

(Continued)

FOREIGN PATENT DOCUMENTS

CA 2325451 2/1999

(Continued)

OTHER PUBLICATIONS

Patent Abstract of Japan, Tomokimi, "Rotary Shaft Seal Device for High Pressure Fluid", Pub. No. 03249481, Pub. Date Jul. 11, 1991.

(Continued)

Primary Examiner—Patricia Engle
Assistant Examiner—Gilbert Lee
(74) Attorney, Agent, or Firm—Barnes & Thornburg LLP

(57) ABSTRACT

The present disclosure relates to a sealing element for a pressed connection that includes an essentially ring-shaped body constructed of elastic material. Also included is at least one sealing edge formed on an interior side and an exterior side of the ring-shaped body. At least one cutting element is embedded in the ring-shaped body and has a cutting edge. The cutting edge is configured to be moved out of the ring-shaped body during a pressing-together of the pressed connection. The present disclosure further relates to a pressed connection for plumbing fixtures. The pressed connection includes a connection piece adapted to have a receiving device constructed therein and configured to receive a pipe end. The connection device is further configured to be pressed together into the pressed connection. Further included is a sealing element arranged in the receiving device, the sealing element comprised as described above.

17 Claims, 5 Drawing Sheets

U.S. PATENT DOCUMENTS

| | | | |
|---|---|---|---|
| 4,729,569 A | 3/1988 | Muller et al. | |
| 4,880,260 A | 11/1989 | Gotoh et al. | |
| 4,917,390 A | 4/1990 | Lee et al. | |
| 4,936,197 A | 6/1990 | Brent | |
| 5,058,907 A * | 10/1991 | Percebois et al. | 277/626 |
| 5,101,757 A | 4/1992 | Schumacher | |
| 5,108,134 A | 4/1992 | Irwin | |
| 5,111,736 A | 5/1992 | Buchberger et al. | |
| 5,295,697 A * | 3/1994 | Weber et al. | 277/616 |
| 5,433,452 A | 7/1995 | Edlund et al. | |
| 5,603,530 A * | 2/1997 | Guest | 285/105 |
| 5,695,224 A | 12/1997 | Grenier | |
| 5,722,702 A | 3/1998 | Washburn | |
| 5,755,446 A | 5/1998 | Dean et al. | |
| 6,224,114 B1 | 5/2001 | Franzen et al. | |
| 6,427,309 B1 | 8/2002 | Viegener | |
| 6,533,331 B2 * | 3/2003 | Hulsebos et al. | 285/323 |
| 6,805,385 B2 | 10/2004 | Viegener | |
| 6,824,172 B1 * | 11/2004 | Komolrochanaporn | 285/340 |
| 6,974,160 B2 * | 12/2005 | Jones | 385/337 |
| 2003/0038481 A1 | 2/2003 | Viegener | |

FOREIGN PATENT DOCUMENTS

| | | |
|---|---|---|
| DE | 32 25 906 A1 | 1/1984 |
| DE | 0 418 732 A1 | 3/1991 |
| DE | 41 0 6459 A1 | 8/1991 |
| DE | 196 31 574 C1 | 11/1997 |
| DE | 297 21 760 U1 | 3/1998 |
| DE | 198 13 805 C1 | 7/1999 |
| DE | 100 54 367 A1 | 5/2002 |
| DE | 101 25 302 C1 | 6/2002 |
| DE | 699 07 592 T2 | 5/2003 |
| DE | 102 07 201 A1 | 9/2003 |
| EP | 0 670 444 A1 | 9/1995 |
| EP | 0 989 348 A1 | 3/2000 |
| EP | 1 081 423 A1 | 3/2001 |
| EP | 1 201 982 A2 | 5/2002 |
| EP | 0 989 348 B1 | 5/2003 |
| GB | 2 115 518 A | 9/1983 |
| WO | WO 97/31215 A1 | 8/1997 |
| WO | WO 00/60267 A1 | 10/2000 |
| WO | WO 02/08614 A2 | 1/2002 |

OTHER PUBLICATIONS

Patent Abstract of Japan, Kazumi et al., "Connecting Method of Pipe", Pub. No. 56009026, Pub. Date Jan. 29, 1981.

Patent Abstract of Japan, Kazumi et al, "Connecting Method of Pipe", Pub. No. 56009025, Pub. Date Jan. 29, 1981.

* cited by examiner

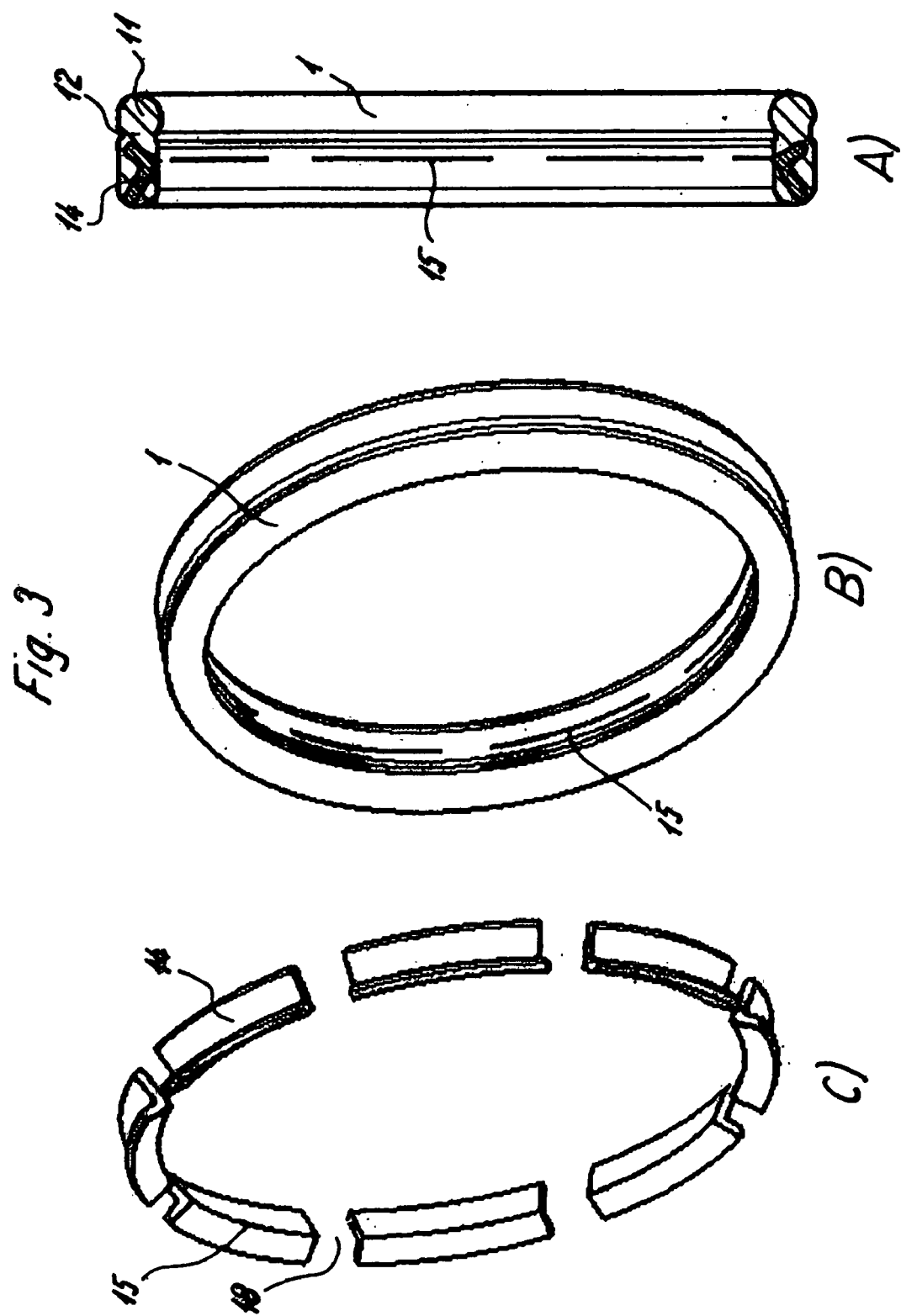

SEALING ELEMENT

This application claims benefit of German Application 20 2004 007 290.4 filed May 7, 2004, which disclosure is hereby incorporated by reference herein.

BACKGROUND AND SUMMARY

The present disclosure relates to a sealing element for a pressed connection. The sealing element includes an essentially ring-shaped body, made of an elastic material, on which ring-shaped body at least one surrounding continuous sealing edge is constructed on an interior side and on an exterior side.

From German Patent Document DE 297 21 760, a pressed connection between a fitting and a metal pipe end is known, in the case of which a receiving device for a sealing ring and a receiving device for a cutting ring are constructed on the fitting. When the fitting is pressed on, cutting teeth of the cutting ring dig into the material of the pipe end in order to provide an axial fixing of the pipe and prevent the pipe from being pulled out from the fitting. In contrast, the adjacently arranged sealing ring provides a durable sealing of the pressed connection even if different temperatures or other environmental influences stress the connection. In this case, the arrangement of a receiving device for a sealing ring and of a second receiving device for the cutting ring require relatively high expenditures for their manufacturing.

The present disclosure relates to a sealing element for a pressed connection which, while its construction is simple, ensures an effective sealing.

Thus, the present disclosure includes a sealing element having an essentially ring-shaped body made of an elastic material, and in which at least one cutting element is embedded. During a pressing-together, or pressed connection, the cutting element can be moved with a cutting edge of the cutting element out of the elastic material. As a result, during the pressing-together, which pressing together includes the sealing element, a sealing-off is achieved. The sealing-off includes surrounding sealing edges and an axial fixing because the cutting element can carry out a corresponding impression by the cutting edge. Thus, a moving of the pressed connection is avoided.

The cutting edge is arranged on an inner surface of the sealing element. Such sealing elements are used for pressed connections in the plumbing field, so that the cutting edge of the sealing element will then engage at an outer circumference of a pipe end. An relative axial movement between the pipe end and the surrounding fitting is thereby prevented, so that a sealing-off can be ensured.

According to an embodiment of the present disclosure, several cutting elements are provided which have a curved construction corresponding to a contour of the ring-shaped body. In this case, several cutting elements are arranged to be distributed along a circumference of the sealing element and form a gap between one another. As a result, the sealing element maintains its flexibility and elasticity and can be easily mounted. One reason is that the function of the cutting elements requires that a hard material, such as metal, be selected which cannot easily be elastically bent. If the cutting elements are arranged only in a segment-type manner, the sealing element can still be moved elastically.

The cutting elements extend in a radial direction from an inner surface to an outer surface. As a result, during the pressing-together, a cutting element can dig on the interior side as well as on the exterior side into a material of a pipe end or of a fitting, so that axial forces can be reduced by the cutting elements. Here, the cutting elements are constructed with a V-shaped cross-section and have a leg which extends diagonally with respect to the radial direction and reaches to a surface of the sealing element. The leg can thereby absorb compressive or tensile stress and take over the function of support.

According to another embodiment of the present disclosure, a sealing ring is arranged adjacent to the cutting elements, which sealing ring is connected by a web with a section in which the cutting elements are embedded. The construction of the sealing ring which, when viewed in the axial direction, is separate from the cutting elements, and is configured such that the sealing edges cannot be damaged during the pressing-together. The round, circular cross-sectional shape of the sealing ring, in this case, provides an inner and outer surrounding sealing edge which is arranged depending on the contour of an outer or inner component. The connection with the remaining section of the sealing element by a web section may mean that only one component has to be mounted for the sealing-off and the holding function.

The sealing element of the present disclosure is generally used in a pressed connection in the plumbing field in which a connection piece of a fitting or of a valve is provided, and into which connection piece a pipe end is pushed. A receiving device is arranged on the connection piece, the receiving device including the sealing element. The connection piece and pipe end can be pressed together.

Other aspects of the present disclosure will become apparent from the following descriptions when considered in conjunction with the accompanying drawings.

BRIEF DESCRIPTION OF THE DRAWINGS

FIG. 3A is a partial sectional view of the sealing element of FIG. 1.

FIG. 3B is a perspective view of the sealing element of FIG. 1.

FIG. 3C is a perspective view of the cutting elements of the sealing element of FIG. 3B.

DETAILED DESCRIPTION

Figure 2:
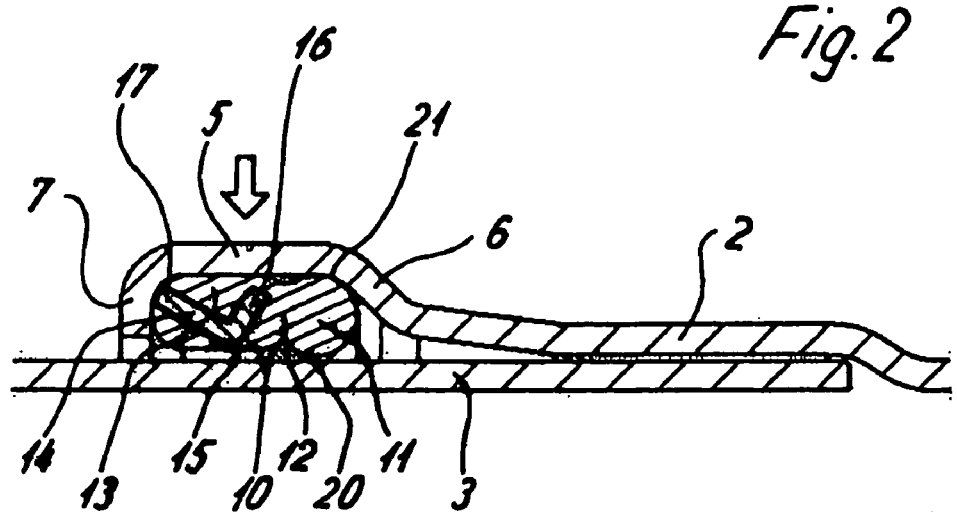
FIG. 2 is an enlarged sectional view of a portion of FIG. 1 including the sealing element.

A sealing element 1 for a pressed connection is arranged inside a connection piece 2 of, for example, a fitting or a valve. A pipe end 3 is shown in FIG. 2 as pushed into the connection piece 2 up to a stop 4. A receiving device 5 is constructed on the connection piece 2, which receiving device 5 has a larger diameter than the remaining part of the connection piece 2. The receiving device 5 essentially has a U-shaped cross-section and two radially inward-projecting legs 6 and 7. Leg 7 is a bent end of the connection piece 2 and leg 6 forms a transition between a section of the receiving device 5 extending in an axial direction and another area of the connection piece 2.

Figure 3D:
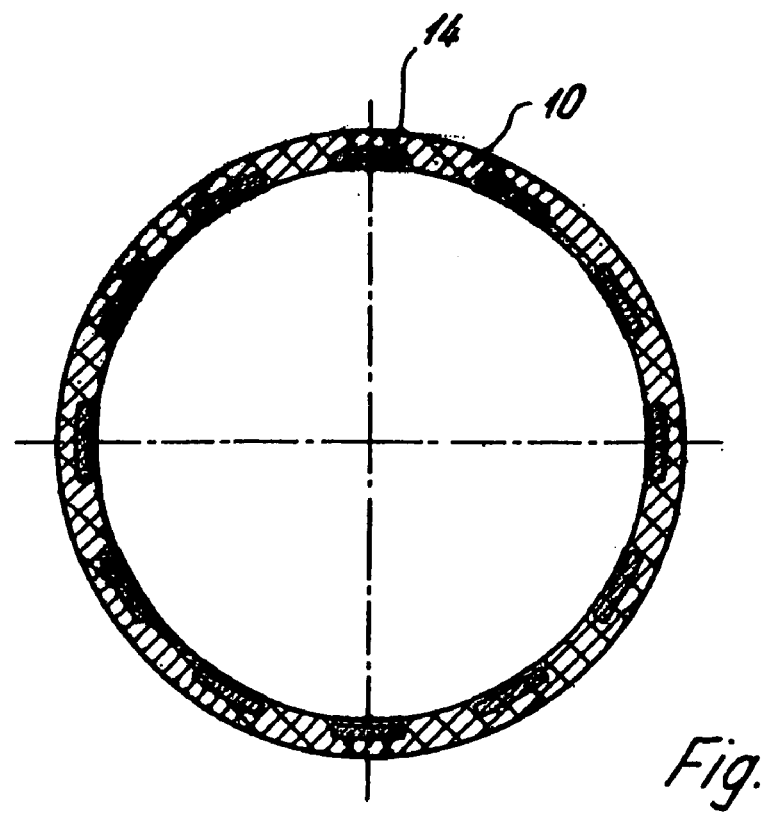
FIG. 3D is a sectional view of the sealing element of FIG. 1.

As illustrated in FIG. 2, the sealing element 1 has an essentially ring-shaped body 10 made of an elastic material. The sealing element 1, on one side, has a sealing ring 11 with a circular cross-section, which by a web section 12 is connected with a section 13 in which one or more cutting elements 14 are embedded. FIG. 3D shows, for example, a plurality of cutting elements 14 embedded in ring-shaped body 10. The cutting elements 14 may have a V-shaped or asymmetrical cross-section. Each cutting element 14 has and an inward-directed cutting edge 15 and two diagonally outward-extending legs 16 and 17.

As illustrated by the arrow in FIG. 2, the receiving device 5 for producing a pressed connection can be pressed-together radially toward the inside, whereby an inner surrounding continuous sealing edge 20 with the tube or pipe end 3 is formed between the sealing ring 11 and the pipe end 3. On an outer side, a surrounding continuous sealing edge 21 is provided which provides a sealing-off in an outer area. During the pressing-together, such a pressure is exercised on the cutting elements 14 that the inner cutting edge 15 digs into the material of the pipe end 3 and at least the leg 17 rests against the leg 7 of the receiving device 5. As a result, axial forces that may be caused by a pulling-out of the pipe end 3 can be reduced or absorbed by one or more of cutting element 14, leg 17, receiving device 5 and fitting or connection piece 2.

Figure 1:
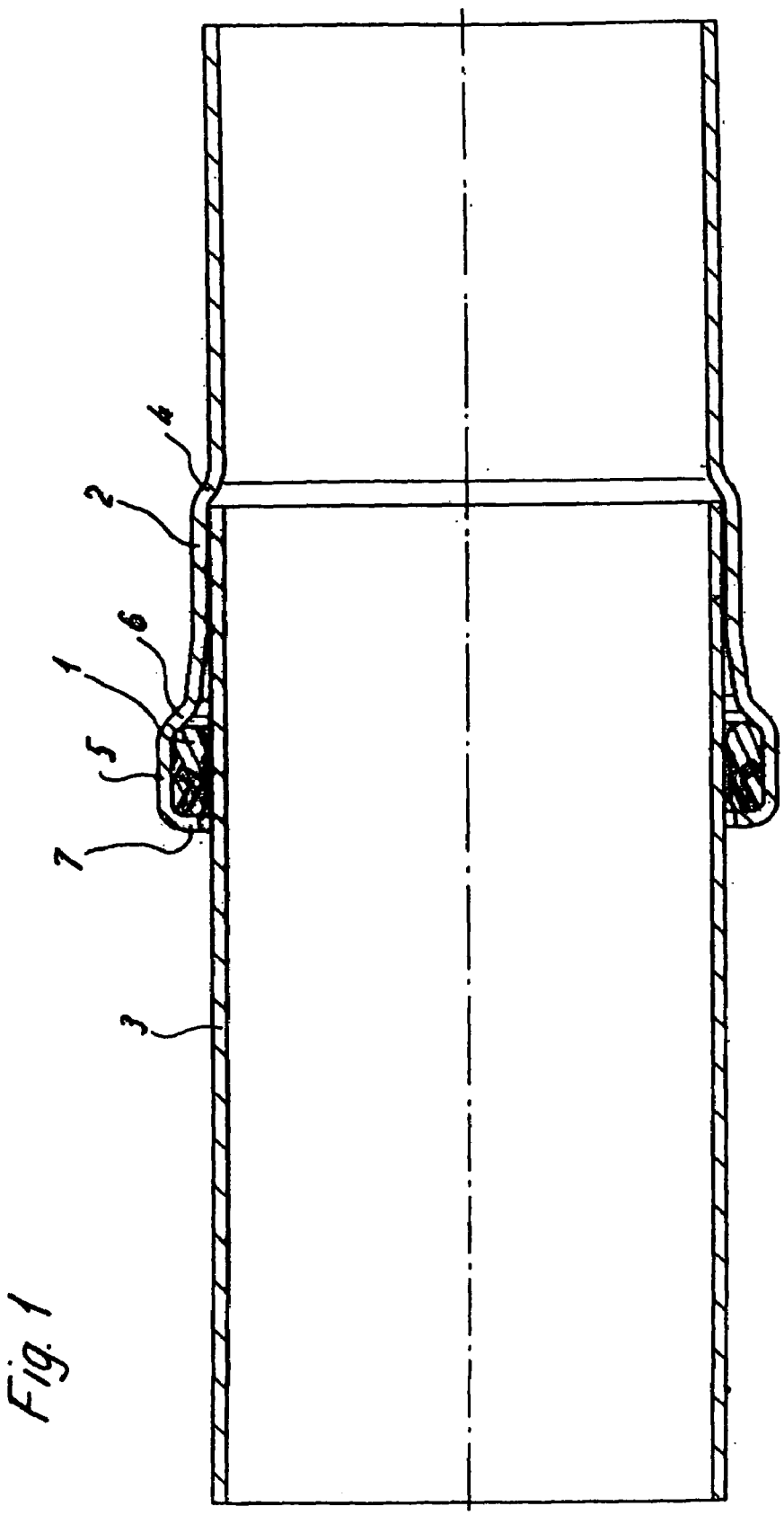
FIG. 1 is a sectional view of a connection arrangement with a sealing element, according to the present disclosure.

FIG. 3A shows the sealing element 1 in the unmounted condition. A sealing ring 11 is arranged at a distance from the section 12 in which the cutting elements 14 are embedded. The cutting elements 14 are shown, for example, as extending only over a portion of the circumference of the sealing element 1 and are arranged with the cutting edge 15 on an inner surface of the sealing element 1, as shown in FIG. 3B. From the outside, the sealing element 1 has the appearance of an oblong ring which is elastic and can therefore easily be mounted in a receiving device 5, as shown in FIGS. 1 and 2.

As illustrated in FIG. 3C, in this embodiment, the sealing element 1 has eight individual cutting elements 14 which are each spaced away from one another by a gap 18. Only elastic material is provided in the gap 18, so that the sealing element 1, as a whole, retains its elasticity for the mounting. It is also conceivable to provide only two more cutting elements 14 instead of eight cutting elements 14.

FIG. 3D is another sectional view of the sealing element 1. The cutting elements 14 are embedded in the material of the ring-shaped body 10. In this case, the cutting elements 14 may be made of steel, and the elastic material may include, for example, rubber, EPDM or another comparable and suitable material.

Figure 4:
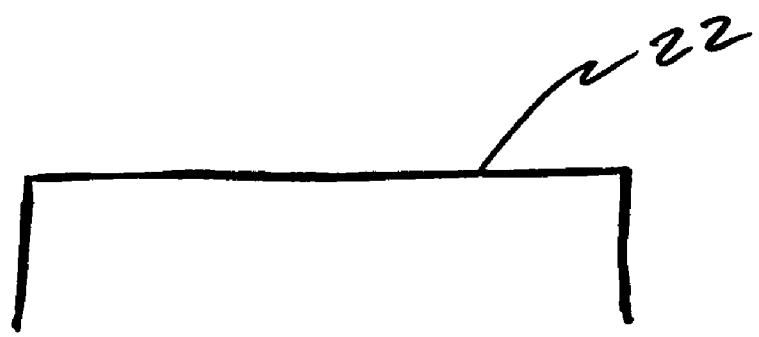
FIG. 4 is an end view of a cutting element having straight rail shaped web sections, according to the present disclosure.
Figure 5:
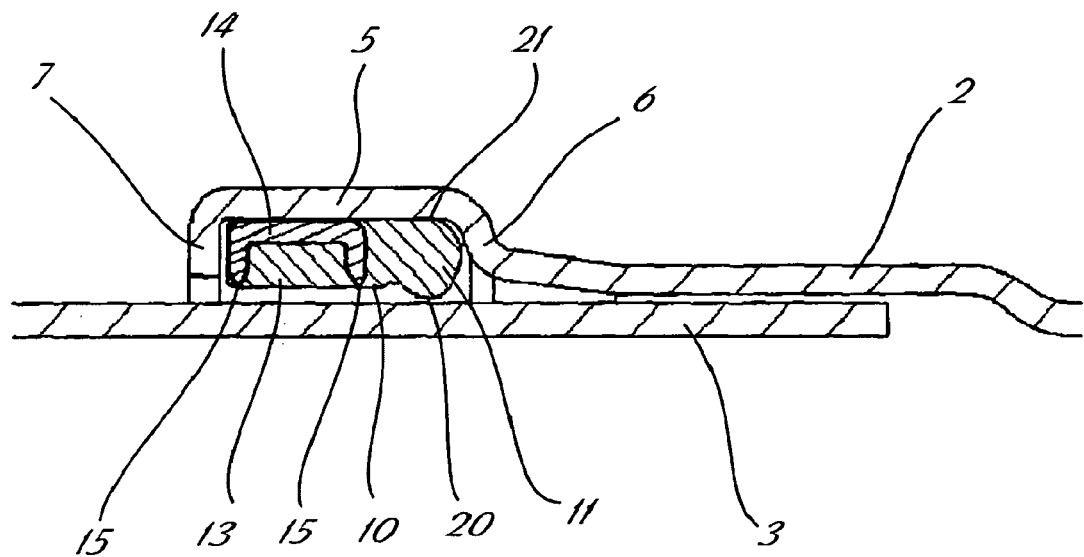
FIG. 5 is an enlarged sectional view of a connection arrangement similar to FIG. 2, showing another embodiment of a sealing element having a cutting element with straight web sections, according to the present disclosure.

In an alternative embodiment, the cutting elements 14 are not curved but are constructed as straight rail-shaped web sections 22, as suggested in FIG. 4. Such a construction may facilitate manufacturing of the cutting elements 14 which can then be cut in the desired length from a slab.

Although the present disclosure has been described and illustrated in detail, it is to be clearly understood that this is done by way of illustration and example only and is not to be taken by way of limitation. The scope of the present disclosure is to be limited only by the terms of the appended claims.

I claim:

1. A sealing element for a pressed connection, the sealing element comprising:
    an essentially ring-shaped body constructed of elastic material;
    at least one sealing edge formed on an interior side and an exterior side of the ring-shaped body;
    at least one cutting element embedded in the ring-shaped body, the at least one cutting element having only a single cutting edge embedded in the ring-shaped body, and the cutting edge configured to be moved out of the ring-shaped body during a pressing-together of the pressed connection; and
    wherein the at least one cutting element has a V-shaped cross-section, the single cutting edge being radially inward-directed, and with respect to a radial direction, the at least one cutting element including two diagonally outward-extending legs.

2. The sealing element according to claim 1, wherein the cutting edge is arranged on an interior surface of the sealing element.

3. The sealing element according to claim 1, wherein the at least one cutting element has a curved construction.

4. The sealing element according to claim 1, wherein the at least one cutting element extends in a radial direction from an inner surface to an outer surface of the sealing element.

5. The sealing element according to claim 1, wherein at least one of the two legs reaches to a surface of the sealing element.

6. The sealing element according to claim 1, further including a sealing ring arranged adjacent to the at least one cutting element, which sealing ring is connected by a web with a section of the sealing ring in which the at least one cutting element is embedded.

7. The sealing element according to claim 1, wherein the at least one cutting element is made of steel.

8. The sealing element according to claim 1, wherein the at least one cutting element has an asymmetrical cross-section.

9. The sealing element according to claim 1, wherein the at least one sealing edge surrounds the ring-shaped body and is continuous thereon.

10. The sealing element according to claim 1, wherein the elastic material of the ring-shaped body is made of rubber.

11. The sealing element according to claim 1, wherein the at least one cutting element includes a plurality of cutting elements.

12. The sealing element according to claim 11, wherein the plurality of cutting elements are distributed over a circumference of the sealing element.

13. The sealing element according to claim 11, wherein each of the plurality of cutting elements extends in a radial direction from an inner surface to an outer surface of the sealing element.

14. The sealing element according to claim 11, wherein the plurality of cutting elements have a V-shaped cross-section.

15. The sealing element according to claim 11, wherein the plurality of cutting elements have an asymmetrical cross-section.

16. A pressed connection for plumbing fixtures, comprising:
    a connection piece adapted to have a receiving device constructed therein and configured to receive a pipe end, the connection piece further configured to be pressed together into the pressed connection;
    a sealing element arranged in the receiving device, the sealing element comprising a ring-shaped body, at least one sealing edge formed in an interior side and an exterior side of the ring body, and at least one cutting element embedded in the ring-shaped body, the at least one cutting element having only a single cutting edge embedded in the ring-shaped body and the cutting edge configured to be moved out of the ring-shaped body during the pressing-together into the pressed connection; and wherein the at least one cutting element has a V-shaped cross-section, the single cutting edge being radially inward-directed, and with respect to a radial direction, the at least one cutting element including two diagonally outward-extending legs.

17. The pressed connection according to claim 16, wherein the at least one cutting element includes a plurality of cutting elements distributed over a circumference of the sealing element, and the cutting edge of each cutting element is arranged on an interior surface of the circumference.

* * * * *